United States Patent [19]

Yamamoto et al.

[11] Patent Number: 4,540,077
[45] Date of Patent: Sep. 10, 1985

[54] CLUTCH COOLING DEVICE

[75] Inventors: Kuniyuki Yamamoto, Tokyo; Kazuo Ohyama, Saitama, both of Japan

[73] Assignee: Honda Giken Kogyo Kabushiki Kaisha, Tokyo, Japan

[21] Appl. No.: 425,777

[22] Filed: Sep. 28, 1982

[30] Foreign Application Priority Data

Sep. 28, 1981 [JP] Japan .................... 56-142674[U]

[51] Int. Cl.$^3$ .............................................. F16D 13/72
[52] U.S. Cl. ................................ 192/70.12; 192/113 B
[58] Field of Search .............. 192/70.12, 89 R, 91 A, 192/96, 112, 113 B, 113 R; 188/71.6, 264 E; 184/6.16, 31; 74/606 A

[56] References Cited

U.S. PATENT DOCUMENTS

| 1,392,932 | 10/1921 | Giffin | 192/113 R |
| 1,545,048 | 7/1925 | Flynn | 192/113 R |
| 1,878,379 | 9/1932 | Church | 192/113 R |
| 3,104,746 | 9/1963 | Gadd et al. | 192/113 B |
| 3,202,253 | 8/1965 | Merritt et al. | 192/113 B |
| 3,366,210 | 1/1968 | Webster | 192/113 B |
| 3,540,557 | 11/1970 | Hasselbacher | 192/113 B |
| 3,734,259 | 5/1973 | Ashfield | 192/113 B |
| 3,912,044 | 10/1975 | Schindelhauer | 184/6.16 |
| 4,085,835 | 4/1978 | Bailey | 192/113 B |

FOREIGN PATENT DOCUMENTS

| 213260 | 6/1960 | Fed. Rep. of Germany | 188/71.6 |
| 601820 | 2/1960 | Italy | 192/96 |

Primary Examiner—Rodney H. Bonck
Attorney, Agent, or Firm—Sughrue, Mion, Zinn, Macpeak and Seas

[57] ABSTRACT

The clutch includes a clutch pressure plate having central through-holes for guiding coolant oil toward friction discs and a clutch case having an inner wall confronting the through-holes and an oil guide rib projecting therefrom. The misted coolant oil splashed by rotation of a clutch outer member is collected by the oil guide rib so that the oil is directed to the clutch discs through the through-holes to thereby enhance the cooling effect for the clutch discs.

7 Claims, 7 Drawing Figures

4,540,077

CLUTCH COOLING DEVICE

BACKGROUND OF THE INVENTION

The present invention relates to a cooling device for clutches.

Wet multiple-disc clutches are lubricated by oil which is used to lubricate the gear on a main shaft and supplied through a central hole in the main shaft to an opposite side of the clutch. Since the amount of oil thus supplied is not large enough, the friction discs of the clutch which have been heated due to friction of the discs upon engagement and disengagement of the clutch are not sufficiently cooled.

SUMMARY OF THE INVENTION

It is, therefore, an object of the present invention to provide a device for lubricating a clutch and sufficiently cooling clutch members heated upon engagement and disengagement of the clutch.

According to the invention, there is provided a cooling device for a friction clutch disposed on a wall of a crankcase in which a speed change gear assembly is accomodated, wherein the clutch includes a clutch pressure plate having central through-hole means for guiding coolant oil toward friction discs and a clutch case having a sidewall confronting the through hole means and having a coolant oil guide rib projecting therefrom.

According to the invention, there is provided a cooling device for a friction clutch disposed on a wall of a crankcase housing therein a transmission unit having a speed change gear assembly, said clutch including a clutch cover, a central clutch member having a plurality of inner clutch discs and coupled to a main shaft, a clutch gear having integrally a plurality of outer clutch discs for engagement with and disengagement from said inner clutch discs, and a clutch pressure plate spring biased for said engagement, said clutch including means for pushing said clutch pressure plate for said disengagement, whereby power may be selectively transmitted from said speed change gear assembly to said main shaft, said cooling device including oil guide means for allowing oil in said clutch cover to be collected to a predetermined portion of said clutch cover and provided on an inner surface of said cover, and a hole formed in said clutch pressure plate, at least one slot formed in said clutch pressure plate for directing said coolant oil toward said inner and outer clutch discs.

DETAILED DESCRIPTION OF THE PREFERRED EMBODIMENTS

Figure 1:
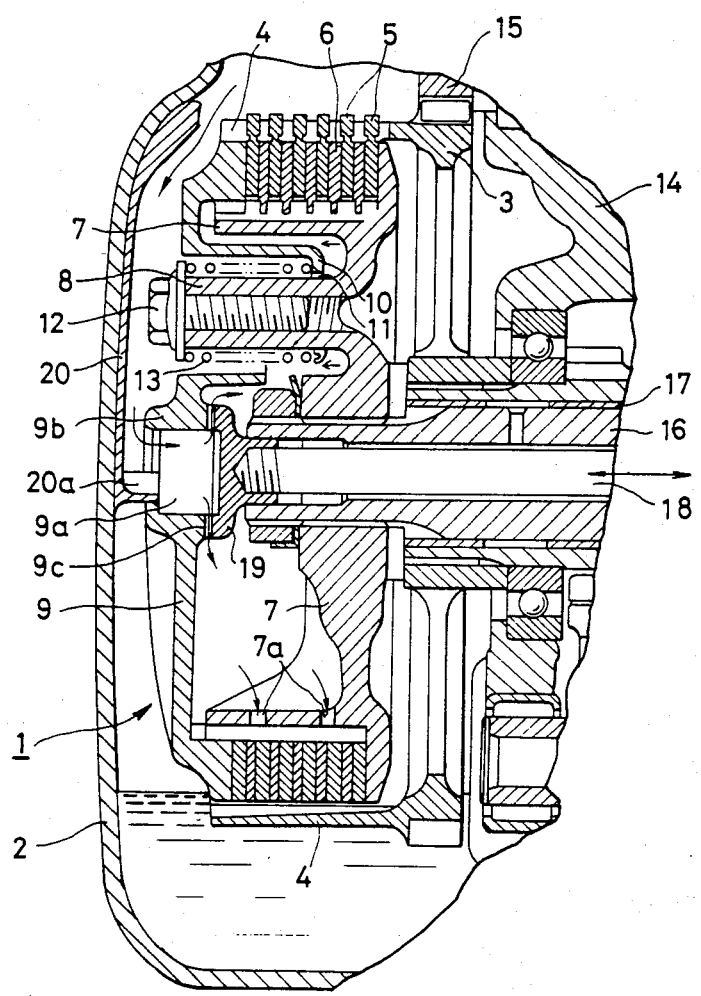
FIG. 1 is a vertical cross-sectional view of a clutch cooling device according to the present invention.
Figure 2:
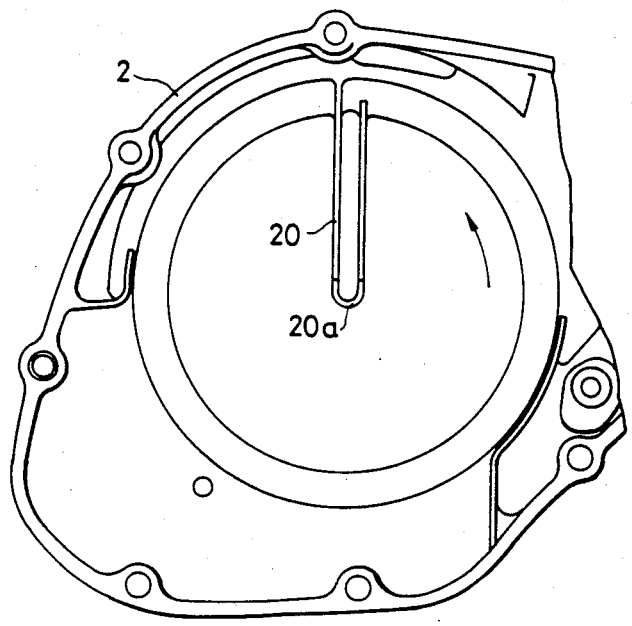
FIG. 2 is a rear elevational view of a clutch cover shown in FIG. 1.

An embodiment of the present invention as shown in FIGS. 1 and 2 will now be described. A wet multiple-disc clutch 1 for use on a motorcycle is sealed in an oiltight manner by a clutch cover 2 detachably mounted on a crankcase 14.

A clutch gear 3 which is an input gear for a clutch is held in mesh with a gear 15 fitted over a crankshaft of an engine (not shown) and is integral with an outer clutch member 4. A plurality of outer clutch discs 5 are secured to the outer clutch member 4 at spaced intervals. Inner clutch discs 6 are fixed to a central clutch member 7 in interdigitating relationship to the outer clutch discs 5.

The central clutch member 7 has a sleeve 8 loosely fitted in a hole 11 defined in a recess 10 of a clutch pressure plate 9. A compression spring 13 acts between the bottom of the recess 10 and a bolt 12 threaded in the sleeve 8 to normally urge the clutch pressure plate 9 against the central clutch member 7. Thus, the clutch discs 5, 6 are held in frictional engagement with each other under the resiliency of the coil spring 13 for transmitting a torque from the outer clutch member 4 to the central clutch member 7.

The crankcase 14 houses a transmission mechanism (not shown) having a main shaft 16 to which the central clutch member 7 is splined, so that a torque can be transmitted from the central clutch member 7 to the main shaft 16. The gear 3 is rotatably fitted over the main shaft 16 through a bearing 17. A shaft 18 is loosely fitted in a central bore in the main shaft 16 and has a presser 19 attached for corotation to a distal end of the shaft 18. The presser 19 has an end face held against a confronting end face of a cylindrical portion 9b of the clutch pressure plate 9 which has a central hole 9a therein. The end face of the cylindrical portion 9b has four slots 9c extending radially outwardly from the central hole 9a toward the outer periphery of the end face.

As shown in FIGS. 1 and 2, the clutch cover 2 has on its inner surface a U-shaped oil guide rib 20 including a lower semicylindrical portion 20a projecting into the central hole 9a in the clutch pressure plate 9.

The multiple-disc clutch 1 shown in FIGS. 1 and 2 will operate as follows: When oil attached to the wet multiple-disc clutch 1 is scattered around under centrifugal forces and due to inertia, the misted oil is guided by the oil guide rib 20 to flow downwardly toward the lower semicylindrical portion 20a from which the oil enters the central hole 9a of the clutch pressure plate 9. The oil then flows out through the slots 9c and reaches oil inlet holes 7a in the central clutch member 7, whereupon the oil passes between the clutch discs 5, 6 and is scattered away under centrifugal forces.

The oil is cooled as it flows on the clutch cover 2 and the oil guide rib 20. While the oil passes between the clutch discs 5, 6, heat generated by the discs 5, 6 is radiated by the oil and the discs 5, 6 and surroundings thereof are effectively cooled.

With the arrangement of the present invention, a relatively large quantity of oil can be circulated without requiring a specially designed oil supply means with the consequence that the clutch can be effectively cooled.

Figure 3:
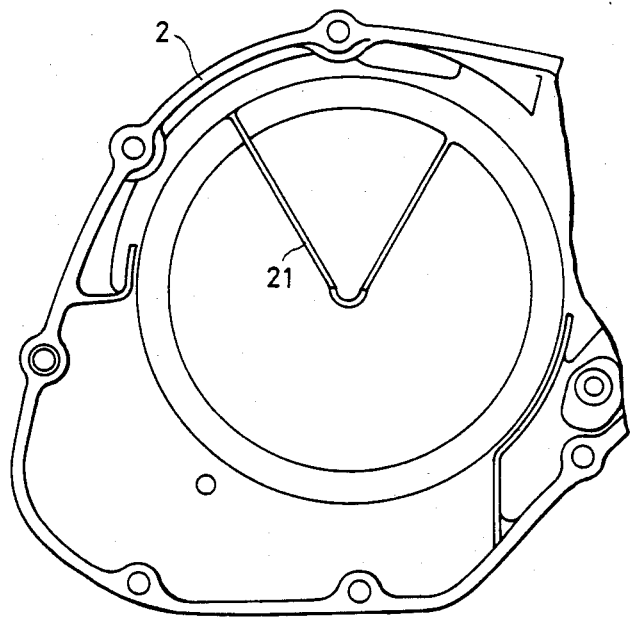
FIG. 3 is a rear elevational view of another clutch cover according to the present invention.

While in the embodiment shown in FIGS. 1 and 2 the coolant oil rib 20 is in the shape of a U, a V-shaped coolant oil rib 21 may instead be provided as shown in FIG. 3. Such a V-shaped coolant oil rib 21 operates as effectively as the U-shaped coolant oil rib according to the embodiment of FIGS. 1 and 2.

Figure 4:
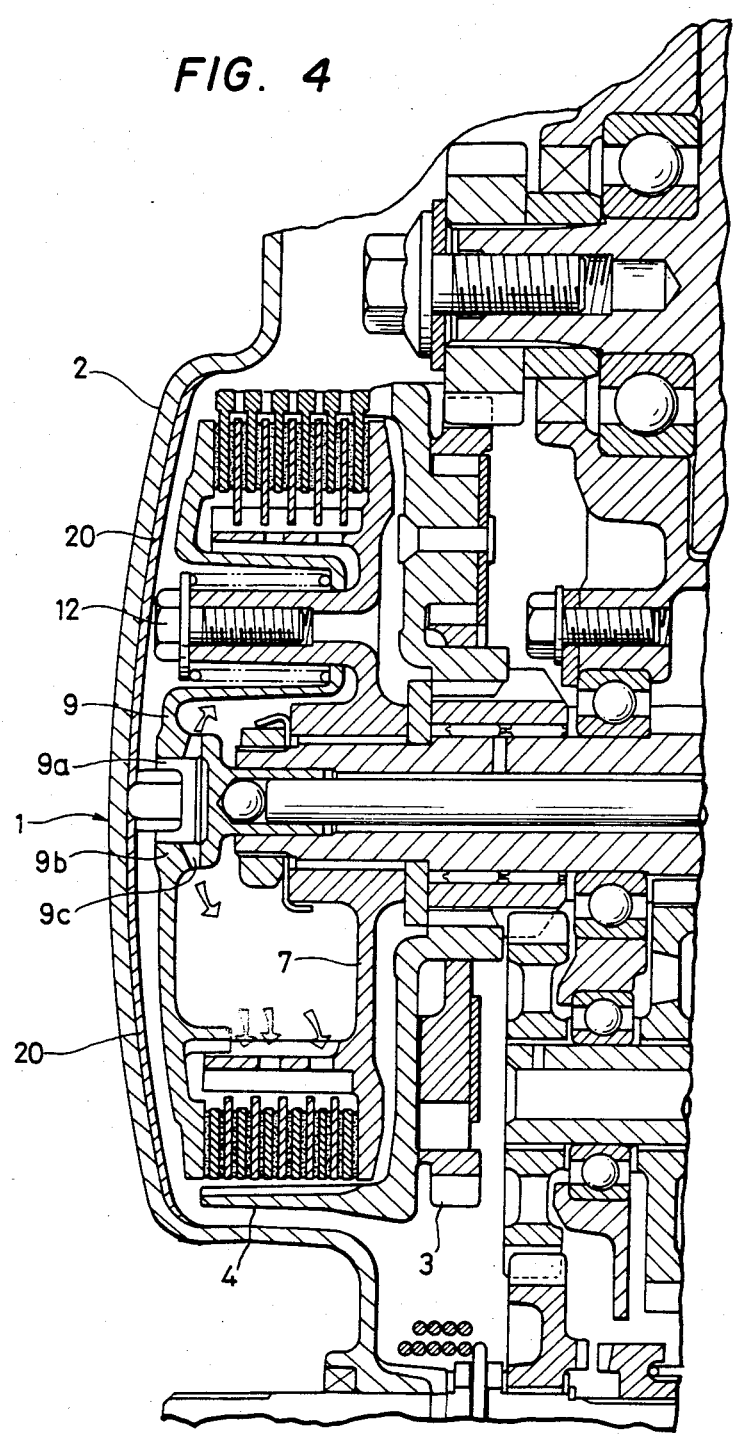
FIG. 4 shows a primary part of the cooling device in which modified slant slits are formed.

FIG. 4 shows modified slots 9c' each of which has a slant wall for directing the oil toward the inner and outer clutch discs positioned on the gear 3 side, so that oil may be effectively supplied therethrough to the clutch discs as indicated by the arrows. In the embodiment shown in FIG. 4 a plurality (two) of oil guide ribs 20 are formed on an inner surface of the clutch cover 2.

Figure 5:
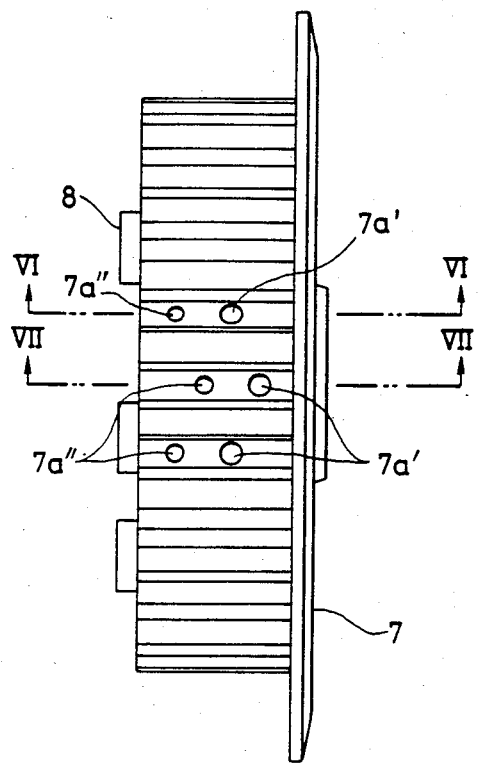
FIG. 5 is a side view of a modified central clutch member.
Figure 6:
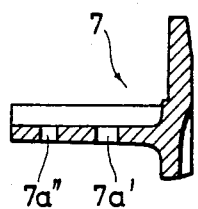
FIGS. 6 and 7 are partial cross-sectional views of the central clutch member taken along lines VI—VI and VII—VII of FIG. 5, respectively.
Figure 7:
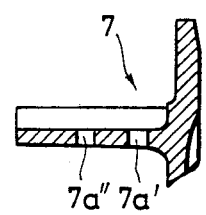

FIG. 5 is a side view showing the central clutch member 7 in detail. In FIG. 5, large diameter holes 7a' and small diameter holes 7a" are formed on recess portions, supporting the clutch inner discs, of the central clutch member 7, and the holes 7a' and 7a" are displaced from the adjacent holes 7a' and 7a", respectively as shown in FIGS. 6 and 7. As shown in FIG. 5 the small diameter holes 7a" are positioned on the side of clutch pressure plate 9 and the large diameter holes 7a' are positioned on the side of the clutch gear 3. Therefore, it is possible to supply the coolant oil uniformly to the friction discs of clutch. With such a construction, the cooling effect may be enhanced even if the clutch discs are slidingly engaged with each other.

What is claimed is:

1. A clutch cooling device for a power transmission unit having a friction clutch disposed on a wall of a crankcase in which a speed change gear assembly is accommodated, wherein said clutch includes a clutch pressure plate having central throughhole means for guiding coolant oil toward friction discs through one or more radial slot and a clutch cover having an inner wall confronting said central throughhole means and an oil guide rib projecting therefrom into said central throughhole means.

2. The device of claim 1, said clutch including a central clutch member having a plurality of inner clutch discs and coupled to a main shaft, a clutch gear having a plurality of outer clutch discs for engagement with and disengagement from said inner clutch discs and a clutch pressure plate spring biased for said engagement.

3. The device of claim 2, said clutch further including means for pushing said clutch pressure plate for said disengagement, whereby power may be selectively transmitted from a speed change gear assembly of said transmission unit to said main shaft.

4. The device of claim 2, said central clutch member having a first hole positioned on the side of said clutch pressure plate and at least one second hole on the side of said clutch gear, in which a diameter of said second hole is greater than that of said first hole.

5. The device of claim 2 wherein said oil guide rib allows coolant oil in said clutch cover to be collected at a predetermined portion of said clutch cover and said central throughhole communicates at least with one of said radial slots for directing said coolant oil towards inner and outer clutch discs.

6. The device of claim 5 wherein said one or more radial slots are directed perpendicularly radially relative to said central throughhole.

7. The device of claim 5, wherein said one or more radial slots are directed obliquely radially relative to said central throughhole.

* * * * *